United States Patent Office 3,444,437
Patented May 13, 1969

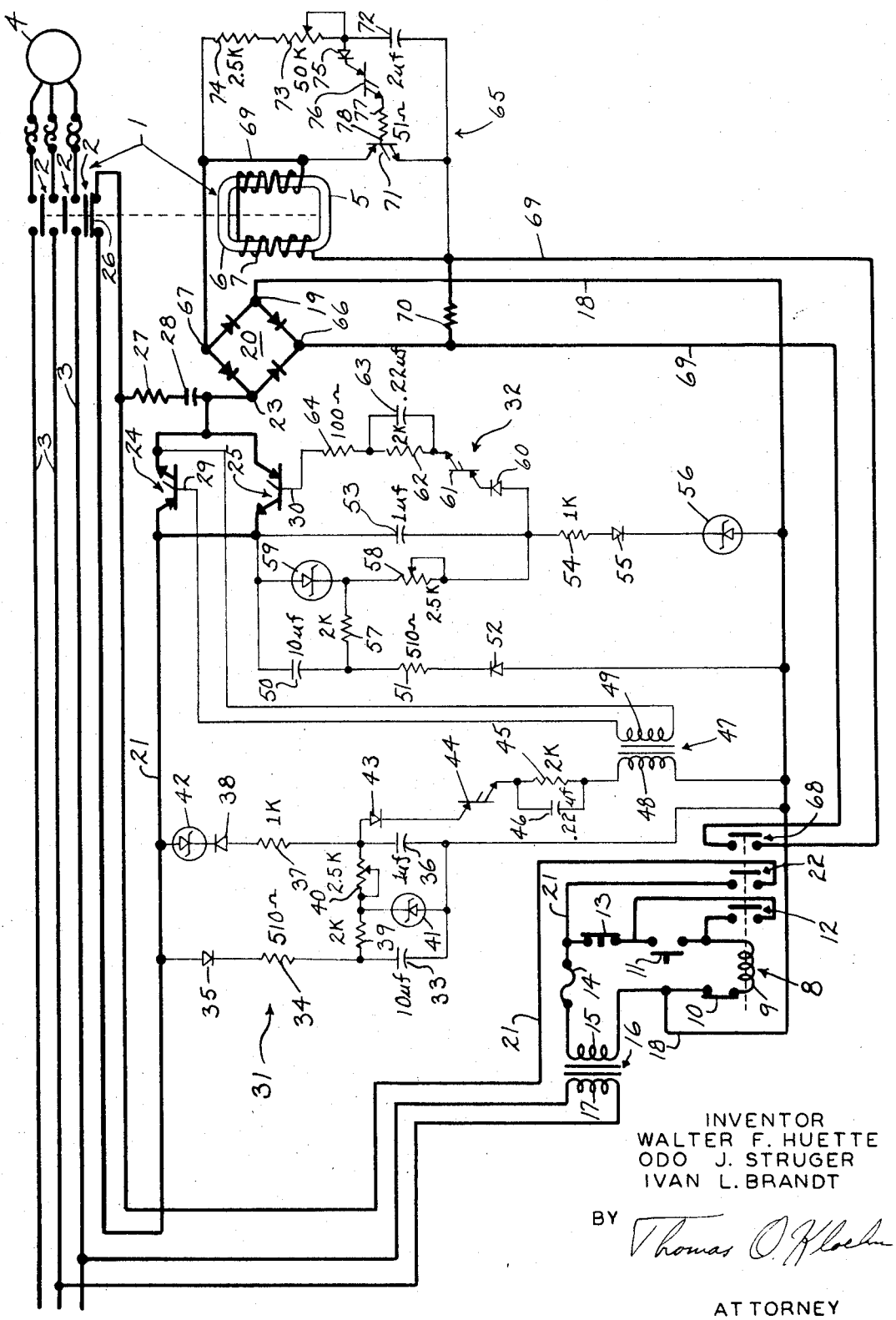

3,444,437
CONTROL CIRCUIT RESPONSIVE TO THE SUM
TOTAL CURRENT TO A LOAD
Walter F. Huette, New Berlin, Odo J. Struger, Milwaukee, and Ivan L. Brandt, Fox Point, Wis., assignors to Allen-Bradley Company, Milwaukee, Wis., a corporation of Wisconsin
Filed Oct. 21, 1965, Ser. No. 499,362
Int. Cl. H01h 47/32
U.S. Cl. 317—148.5      6 Claims

ABSTRACT OF THE DISCLOSURE

A motor control circuit includes a pilot switch that connects the input of a rectifier across the A.-C. line and the rectifier output across the coil of a D.-C. magnet switch. SCR's are connected in parallel to the input of the rectifier to control pick-up. Another SCR is connected across the magnet switch coil to control drop-out. Each SCR has a Shockley diode coupled to its gate circuit to fire it. Each Shockley diode is connected across a sampling capacitor which develops its breakover voltage. Each Shockley diode on the A.-C. line side is connected to discharge a large capacitor to the gate of the SCR.

---

The present invention relates to an electrical integrator for controlling current flow in a line, and more specifically the invention resides in an integrator comprising a controllable current valve responsive to a triggering signal, a timing circuit including a sampling capacitor adapted to be charged by a current to be integrated, a signal shaping device containing a normally non-conductive voltage responsive current gate connected to said sampling capacitor, and a coupling means connecting said voltage responsive current gate to said controllable current valve. Also, the invention resides in the combination of such an electrical integrator with the control current supply for a magnet switch to reduce impact force of pick-up or drop-out of the switch.

Magnet switches used to control power lines to machines and particularly the larger magnet switches such as NEMA number 8 and number 9 switches develop large kinetic energy on pick-up and drop-out due to the large size and weight of the moving parts and the distance traveled. This energy is dissipated in the impact at the end of the pick-up and drop-out strokes. The operating life of these switches has been limited by the structurally destructive effects of impact, and, accordingly, the problem of impact imposes many limitations on the design of these switches that impart no concomitant benefits and some limitations to the primary function of these switches.

Although to some extent the problem of impact seems unavoidably inherent in the need for firm and rapid closing and opening of the line contacts of the magnet switch, the present invention has minimized the problem sufficiently to increase the operating life of such switches by at least 40%. Moreover, this achievement is accomplished entirely electrically without any requirement for structural modification of, or additions to the switch. During the pick-up stroke of the switch, the present invention operates on the alternating current side of the control circuit to compute the amount of applied electrical energy in each half cycle and, on the basis of that computation and a preset nominal value, to control the amount of electrical energy fed to the switch in the following half cycle so that the switch will be operated by precisely the nominal power for which it is designed. The significance of this control is better appreciated when it is recalled that the designed nominal operating energy of these switches must be a substantial safety factor less than the anticipated electrical energy available, which may fluctuate widely. During drop-out, the invention operates to compute the extent of decay of the holding magnetic field, after the switch coil is disconnected from its energizing source, and when the field has decayed to a predetermined level, the invention inserts a very low resistance shunt across the coil to reduce sharply the rate of field decay. As a result, a quick and sharp contact break is achieved, but the residual field thus preserved retards velocity during the remainder of the drop-out stroke, to reduce impact.

The present invention makes possible the precise adjustment of impact forces on both pick-up and drop-out to any desired value through a broad range extending up to full impact force. The effects of the invention when adjusted for optimum switch operation are not only observable in terms of extended switch life, they are dramatically evident both audibly and visually even to the untrained observer. Moreover, in its broadest aspect the present invention presents a new analog computer and signal integrator, the utility of which need not be limited to impact reduction for magnet switches. The invention integrates the energy in a conductor and at a preset integral it instantaneously emits a trigger signal that may be used to trigger performance of a variety of diverse operations.

Accordingly, the primary objects and advantages of the present invention may be summarized as follows:

To provide an electrical computer for integrating the energy in a conductor and emitting a triggering signal at a preset integral.

To provide an economical electrical impact reduction device for a magnet switch.

To minimize the pick-up impact forces in a magnet switch electrically without requiring structural modifications in or additions to the switch.

To reduce the drop-out impact force in a magnet switch electrically without requiring structural alteration of the switch.

To provide a preset constant amount of electrical energy to a load from a widely fluctuating source.

To provide a means for electrically controlling the impact forces in a magnet switch over a broad range to achieve an optimum operation of the switch.

To provide an electrical computer for integrating the energy in a conductor and emitting a triggering signal at a preset integral, which computer requires no additional power source but is operated by the energy in the conductor.

In addition to these principal objects and advantages already mentioned, others will emerge from the disclosure of the accompanying drawing and the following description of the embodiment of the invention shown in that drawing. It is to be emphasized that the specific embodiment shown and described in great detail here neither defines nor limits the scope of the invention, but instead it merely sets forth the best mode of carrying out that invention contemplated at this time by the inventors. As distinguished from the embodiment described, the subject matter regarded as the invention is particularly pointed out and distinctly claimed in the claims at the conclusion of this specification.

In the drawing:

FIG. 1 is a schematic diagram of an embodiment of the present invention to reduce and control the pick-up and drop-out impact of a NEMA No. 8 magnet switch in a motor control.

The schematic diagram of the drawing shows the present invention as applied to impact reduction in a NEMA number 8 size magnet switch 1 that has its line contacts 2 connected in power lines 3 to control a motor 4. The line contacts 2 of the magnet switch 1 are attached through appropriate mechanical structure, which is not shown, to a magnetic armature member 5 that is mounted for vertical movement so that it can close and open with a magnetic yoke member 6 under the influence of a magnetic field generated by a coil 7, when the coil 7 is electrically energized by a D.C. control current. The conductors shown in the drawing that carry line current for the motor 4 and those that carry A.C. and D.C. control current for the coil 7 are represented with heavy lines, and the conductors bearing comparatively low power intelligence signals are represented with fine lines.

The energization and deenergization of the coil 7 of the magnet switch 1 is effected by a control relay 8 that has its coil 9 connected through a series circuit containing an overload contact 10, a normally open "start" switch 11, which has a holding contact 12 in parallel with it, a normally closed "stop" switch 13, and a fuse element 14, across a secondary 15 of a power transformer 16, which has its primary 17 connected across the power lines 3. This conventional structure operates so that the control relay coil 9 is energized by closing the "start" switch 11. When the control relay 8 is thus energized, it closes its holding contact 12, which is connected across the "start" switch 11, so that the "start" switch 11 may be released to return to its normally open position. The control relay 8 will remain energized until either the "stop" switch 13, or the overload contact 10 is opened.

The alternating current control bus for the switch 1 has its line side 18 connected from a point between one end of the secondary 15 of the power transformer 16 and the overload contact 10 to one input terminal 19 of a full wave rectifier 20. The controlled side 21 of the alternating current bus is connected through the fuse element 14 to the other end of the secondary 15, and through an alternating current control contact 22 of the control relay 8 and a pair of parallel circuit branches to the other input terminal 23 of the full wave rectifier 20. One branch of the parallel circuit in the controlled side 21 of the alternating current control bus contains a normally nonconductive controllable current valve made up of a pair of oppositely oriented, parallel connected silicon controlled rectifiers 24 and 25 in series with a normally closed economizer contact 26 that is actuated by the armature 5 of the magnet switch 1. The other branch of the parallel circuit contains damping resistor 27 and an economizer capacitor 28 connected in series.

The silicon controlled rectifiers 24 and 25 are generically termed "controllable current valves" because each has a control element 29 and 30, respectively, to receive a triggering signal which will trigger the normally nonconducting current valves 24 and 25 into conductance. The silicon controlled rectifiers 24 and 25, commonly abbreviated "SCR," function as solid state counterparts of a well known thyratron tube, in that both the SCR and the thyratron will become conductive, when a voltage of appropriate polarity is imposed across its line terminals, and an instantaneous, "triggering signal or spike imposed upon its control element. Once an SCR or a thyratron is thus rendered conductive, it will remain fully conductive so long as a potential of appropriate polarity is imposed across its line terminals. However, when the line potential reverses polarity or is reduced below a designed value, both the thyratron and an SCR will be restored to a nonconductive state. It follows that the presence of a triggering signal without the appropriate line voltage will not render an SCR or a thyratron conductive. These characteristics of SCR's, which are shared with thyratons and perhaps other devices, are well known, but since they play an important role in the embodiment shown, these characteristics are recited here to suggest the type of circuit component that can be utilized for the controllable current valves 24 and 25.

If a triggering signal is imposed upon the control element 29 of the upper SCR 24 when the controlled side 21 of the alternating current bus is positive, the upper SCR 24 will conduct until shortly before the polarity in the alternating current reverses. Similarly, if a triggering signal is imposed upon the control element 30 of the lower silicon controlled rectifier 25 when the line side 18 of the alternating current control bus is positive, the lower SCR 25 will continue to conduct through the half cycle until shortly before polarity is again reversed at the beginning of the subsequent half cycle. Therefore, the amount of control energy conducted to the full wave rectifier 20 is determined by the timing of the triggering pulses or signals to the control elements 29 and 30 of the SCR's 24 and 25. If the triggering pulses occur late in the appropriate half cycle, relatively little power will be conducted by the SCR's 24 and 25, but if the appropriate triggering signal appears early in the half cycle then full, or close to full power will be conducted by the SCR's 24 and 25.

By properly timing the firing of each SCR 24 and 25 during the half cycle when it controls current flow in the A.C. control bus, a predetermined amount of energy can be delivered to the rectifier 20. This timing is effected by two, largely identical triggering circuits 31 and 32 for each of the SCR's. To simplify discussion, let the half cycle during which current flows through the controlled side 21 of the A.C. control bus to the rectifier 20 be termed the "positive half cycle," and the half cycle during which current flows from tthe line side 18 of the A.C. control bus to the rectifier 20 be termed the "negative half cycle" of the A.C. control current for the magnet switch 1. During the positive half cycle, the SCR 24 that is uppermost in the drawing controls current flow in the A.C. control bus, and during the negative half cycle the SCR 25 that is lowermost in the drawing controls current flow in the A.C. control bus.

The positive half cycle triggering circuit 31 is leftmost in the drawing and it contains four major subcircuits: a power supply, a timing device, a signal shaping device and a coupling means for connecting the output of the shaping circuit to the control element 29 of the positive half cycle SCR 24. The power supply in this embodiment is a 10 microfarad power capacitor 33 connected in series with a 510 ohm current limiting resistor 34 and a discharge blocking diode 35 across the A.C. control bus. The timing device is made up of a 1 microfarad sampling capacitor 36, one plate of which is connected directly to the line side 18 of the A.C. control bus, and the charge path of which includes a 1 kilohm resistor 37 and a charge blocking diode 38 connected in series from the sampling capacitor 36 to the controlled side 21 of the A.C. control bus. The timing device is connected to the power capacitor 33 and through a 2 kilohm voltage dropping resistor 39 and a 2.5 kilohm timing potentiometer 40. Parallel with the two capacitors 33 and 36, and connecting a point between the voltage dropping resistor 39 and the timing potentiometer 40 with the line side 18 of the A.C. control bus is a discharge path for the sampling capacitor 36 containing a reference Zener diode 41 which serves to establish a constant reference voltage. A limiter Zener diode 42 is inserted in the sampling capacitor charging path between the charge blocking diode 38 and the controlled side 21 of the A.C. control bus. The Zener diodes 41 and 42 each have a reverse breakdown voltage of 75 volts.

The signal shaping device in the positive half cycle triggering circuit is connected across the sampling capacitor 36 ultimately to the line side 18 of the A.C. control bus. The signal shaping device in this embodiment consists of a protective blocking diode 43 that has its anode connected to the sampling capacitor 36 and its cathode connected to a voltage responsive current gate in the form of a four layer or Shockley diode 44, which has a forward breakover voltage of 20 volts. The Shockley diode 44 is connected to a parallel RC circuit consisting of a 2 kilohm discharge resistor 45 and a 0.22 microfarad oscillator capacitor 46. Finally, the coupling means for connecting the output of the signal shaping circuit to the control element 29 of the SCR 24 is a coupling transformer 47 which has its primary 48 connected between the parallel RC circuit in the signal shaping device and the line side 18 of the control bus and its secondary 49 connected across the control element 29 of the SCR 24 and the A.C. control bus.

Although Shockley diodes and Zener diodes are well known, the importance to this embodiment of the invention of certain of the operating characteristics of those semiconductors merits a recital of those characteristics. The term "Shockley diode" is a well known trade name for a four layer diode. Each of the four layer diodes used in the embodiment described has a 20 volt forward breakover voltage and a negligible drop across it when it is in the "on" state. In other words, until the voltage applied across the four layer or Shockley diode reaches 20 volts, the device presents such an extremely high resistance as to be "off" or nonconductive, for all practical purposes. When the designed breakover voltage is reached, the resistance of the device drops to a negligible quantity, and it is "on," in which condition it remains until the current drops below a designed holding value, when it returns to the "off" state. The term "Zener diode" also is a well known trade name referring to a single junction diode that manifests the unique Zener knee in its volt-ampere characteristics. The control region for a Zener diode is defined by its reverse volt-ampere characteristic, in other words, by its reverse breakdown voltage. The Zener knee referred to above is the graphic representation of the sharp break from practical nonconductance to conductance at the nominal Zener voltage, which for the devices used here is 75 volts. Hence, in the embodiment of the invention described, the Zener diodes 41, 42, 56 and 59 will remain nonconductive in the reverse direction until the reverse voltage applied across them reaches 75 volts, when they will begin conducting, but the voltage drop across the device during the conductive state will remain at 75 volts. Because of the characteristics described, the Shockley diodes are able to serve admirably to provide a spike-like triggering signal and the Zener diodes are well suited for the essentially voltage regulating functions which they perform in this embodiment.

The triggering circuit for the SCR 25 controlling the negative half cycle is almost completely identical to the triggering circuit described above for the other SCR 24. Accordingly, the negative half cycle triggering circuit may be thought of as the combination of a power supply, a timing device, a triggering signal shaping device, and an output coupling means. The power supply is made up of a 10 microfarad power capacitor 50 connected in series with a 510 ohm current limiting resistor 51 and a discharge blocking diode 52 across the A.C. control bus, but the discharge blocking diode 52 of the negative half cycle triggering circuit 32 is oppositely oriented from the discharge blocking diode 35 of the positive half cycle triggering circuit 31, so that the two power capacitors 33 and 50 charge during opposite half cycles. The timing device includes a 1 microfarad sampling capacitor 53 connected in series with a 1 kilohm sampling resistor 54, a charge blocking diode 55 and a limiter Zener diode 56 across the A.C. control bus, but again the charge blocking diode 55 and the limiter Zener diode 56 of the negative half cycle triggering circuit 32 are oppositely oriented from the corresponding components of the positive half cycle triggering circuit 31, so that the two sampling capacitors 36 and 53 charge during opposite half cycles.

The power capacitor 50 is connected to the sampling capacitor 53 by series connected 2 kilohm voltage dropping resistor 57 and a 2.5 kilohm timing potentiometer 58. A reference Zener diode 59 is connected from a point between the voltage dropping resistor 57 and the timing potentiometer 58 to the controlled side 21 of the A.C. bus to serve also as a discharge path for the sampling capacitor 53. The Zener diodes 56 and 59 have 75 volt reverse breakdown voltages.

The signal shaping device of the negative half cycle triggering circuit 32 has a protective blocking diode 60 connected in series with a voltage responsive current gate in a four layer or Shockley diode 61 having a 20 volt forward breakover voltage, so that the anode of the protective blocking diode 60 is connected to the plate of the sampling capacitor 53 that is remote from the A.C. control bus. A parallel RC network, which is made up of a discharge resistor 62 and an oscillator capacitor 63, is connected to the Shockley diode 61 to complete the signal shaping device. The coupling means in the negative half cycle triggering circuit 32 differs from that of the positive half cycle triggering circuit in that it consists of a 100 ohm coupling resistor 64 connecting the RC network to the control element 30 of the negative half cycle SCR 25.

The drop-out or opening impact reduction device 65 of the magnet switch 1 is in the direct current side of the full wave rectifier 20. Positive and negative output terminals 66 and 67, respectively, of the full wave rectifier 20 are connected across the coil 7 of the magnet switch 1 through a direct current control contact 68 on the control relay 8 and a direct current control bus 69. Also, a field dissipating resistor 70 is connected across the direct current control contact 68 of the control relay 8, and a normally nonconductive current valve in the form of an SCR 71 is connected across the coil 7. The SCR 71 has a triggering circuit which is made up of a timing device, a signal shaping device and coupling means, with the coil 7 serving as a power supply.

The timing device is made up of a 2 microfarad field measuring capacitor 72 connected in series with a 50 kilohm timing potentiometer 73 and a 2.5 kilohm time constant resistor 74 across the coil 7. The signal shaping device is connected to the field measuring capacitor 72 at a point between the timing potentiometer 73 and the field measuring capacitor 72, and it consists of a protective blocking diode 75 connected in series with a voltage responsive current gate in the form of a four layer, or Shockley diode 76 having a 20 volt forward breakover voltage. A coupling means made up of a 51 ohm coupling resistor 77 connects the Shockley diode 76 to a control element 78 of the SCR 71.

In practical operation, during the first two half cycles after the control relay 8 has been energized, the pick-up impact reduction circuit is in a highly dynamic condition. An accurate, quantitative statement of this dynamic condition during practical operation would have to take into account an all but infinite number of initial conditions. The practical importance of an accurate statement of the actual operation during the first two half cycles is of limited value. Hence, although a mathematical analysis of this dynamic condition may be accomplished by well known procedures, the minimal value of such an analysis to this disclosure fails to justify the insertion of these complexities here, and the present disclosure provides an ample basis from which those skilled in the art may perform that analysis if they wish to do so.

Therefore, to describe the operation of this embodiment of the invention hypothetical conditions will be assumed that will admit of a more straightforward qualitative disclosure of the invention. The power supplied across the power transformer 16 to the control circuit of the magnet switch 1 will be assumed to be an A.C. single phase, 60 cycle, 110 volt RMS supply. Assume further that the control relay 8 is energized to close its contacts 12, 22 and 68 when the instantaneous voltage of the supply is zero at the beginning of a positive half cycle, which will be referred to as the first positive half cycle. The first positive half cycle is followed, of course, by a first negative half cycle, a second positive half cycle, a second negative half cycle, and so on.

During the first positive half cycle, four important conditions are established: first, the power capacitor 33 of the positive half cycle triggering circuit 31 is charged and a reference voltage of 75 volts is developed across the reference Zener diode 41; second, the sampling capacitor 36 of the positive half cycle triggering circuit is charged to fire the Shockley diode 44 and send a triggering signal through the RC network and the coupling transformer 47 to the control element 29 of the positive half cycle control SCR 24, so that the SCR 24 will be rendered conductive relatively early in the first positive half cycle; third, the sampling capacitor 53 of the negative half cycle triggering circuit 32 receives a reverse bias, or sample charge; and, fourth, the positive control SCR 24 is turned off near the end of the first positive half cycle when the amplitude of the control voltage approaches zero. The power capacitor 33 of the positive half cycle triggering circuit 31 is charged through the discharge blocking diode 35 and the series connected resistor 34, and its charge is the source of the reference voltage of 75 volts developed across the reference Zener diode 41, as it gradually discharges through the voltage dropping resistor 39 and the Zener diode 41 which has been rendered conductive by it. The sampling capacitor 36 in the positive half cycle triggering circuit 31 is charged through the same discharge blocking diode 35 and resistor 34 as the power capacitor 33, and then through the voltage dropping resistor 39 and the timing potentiometer 40. When the sampling capacitor 36 is charged sufficiently to create a forward voltage of 20 volts across the Shockley diode 44, the Shockley diode 44 breaks over, and the sampling capacitor 36 discharges rapidly, sending a signal through the coupling transformer 47 to fire the SCR 24. Since there was no reverse bias charge on the sampling capacitor 36 prior to the first positive half cycle, the SCR 24 is fired relatively early in the first positive half cycle. Meanwhile, the sampling capacitor 53 in the negative half cycle triggering circuit samples the first positive half cycle by taking a reverse biasing charge (relative to its Shockley diode 61) during the time when the first positive half cycle imposes a voltage in excess of 75 volts across the limiter Zener 56. At the end of the first positive half cycle, the positive half cycle controlling SCR 24 is restored to its nonconductive state by the want of sufficient forward voltage across its line terminals.

During the first negative half cycle, six conditions are developed by the operation of the pick-up impact reduction circuit: first, the power capacitor 50 in the negative half cycle triggering circuit 32 is charged and a 75 volt reference is developed across the reference Zener diode 59; second, the sampling capacitor 53 in the negative half cycle triggering circuit 32 is discharged of its reverse biasing charge and recharged in the opposite polarity until its charge impresses a voltage of 20 volts across the parallel Shockley diode 61, at which time the Shockley diode 61 conducts to fire the negative control SCR 25; third, the sampling capacitor 36 of the positive half cycle triggering circuit 31 samples the negative half cycle by receiving a reverse bias charge during the time when 75 volts, developed across its series connected limiter Zener diode 42 causes it to conduct; fourth, the power capacitor 33 in the positive half cycle triggering circuit 31 gradually, but slightly, discharges through the reference diode 41 maintaining a 75 volt forward reference voltage; fifth, as the amplitude of the negative half cycle diminishes from its peak, the sampling capacitor 36 begins to discharge its reverse bias charge through the reference Zener diode 41; and, sixth, when the negative half cycle approaches zero amplitude, the negative control SCR 25 reverts to a nonconductive state. The power capacitor 50 of the negative half cycle triggering circuit 32 is charged through the blocking diode 52 and resistor 51 connected in series with it, and the discharging of the reverse bias, or sample charge on the sampling capacitor 53, which began after the peak of the previous positive half cycle, continues and is accelerated by the potential developing across the reference Zener diode 59. Since the discharge path for the sample charge is through the reference Zener diode 59, the rate of discharge may be adjusted by adjusting the setting of the timing potentiometer 58. After the reverse bias, or sampling charge has been discharged, the sampling capacitor 53 in the negative half cycle triggering circuit is recharged from the power capacitor 50 until its charge is sufficient to impress 20 volts across the Shockley diode 61, causing it to breakover. When the Shockley diode 61 connected to the sampling capacitor 53 in the negative half cycle triggering circuit thus becomes conductive, a portion of the forward charge on the sampling capacitor 53 discharges through it to trigger the negative control SCR 25.

Due to the time required to charge the power capacitor 50 in the negative half cycle triggering circuit 32 during the first negative half cycle, the firing of the negative control SCR 25 is delayed beyond the time dictated by the sample charge on the sampling capacitor 53 from the first positive half. As a result, the energy transmitted to the rectifier 20 during the first negative half cycle is commensurately diminished, but since the positive control SCR 24 was fired early in the first positive half cycle because there was no sample charge on the sampling capacitor 36 in the positive half cycle triggering circuit 31, the first positive half cycle provided excess energy to the rectifier 20, and the average energy of the first cycle met the optimum desired value. The imbalance of the half cycles conducted during the first cycle, however, is limited to the first cycle and does not recur in subsequent cycles.

With the second positive half cycle normal, steady state operation begins. In the positive half cycle triggering circuit 31, the power capacitor 33, although retaining most of its charge from the first positive half cycle, has its charge replenished, and the sampling capacitor 36 completes the discharge of its sample charge and is recharged to fire the Shockley diode 44, and through it, the positive control SCR 24. In the negative half cycle triggering circuit 32, the sampling capacitor 53 samples the portion of the second positive half cycle in excess of 75 volts amplitude by receiving a reverse biasing charge when the limiter Zener diode 56 conducts. Meanwhile, the power capacitor 50 in the negative half cycle triggering circuit 32 supplies the energy so that reference Zener diode 59 can maintain a 75 volt reference voltage.

During the second negative half cycle, the negative half cycle triggering circuit 32, the charge of the power capacitor 50 is replenished, the discharge of the sampling charge on the sampling capacitor 59 is complete and it is recharged to fire the negative control SCR 25. Meanwhile, the sampling capacitor 36 of the positive half cycle triggering circut 31 samples the negative half cycle, while power capacitor 33 and the reference Zener diode 41 maintain the 75 volt reference voltage.

By preventing the sampling capacitors 36 and 53 from receiving a sampling charge until the amplitude of the respective sampling cycle exceeds 75 volts, the limited Zener diodes 42 and 56 multiply the relative magnitude of every fluctuation of control voltage amplitude. This renders the integrating action of the triggering circuits 31 and 32 much more sensitive and precise so that the pick-up impact reduction circuit can provide an almost perfectly constant average power to the rectifier 20. The reference Zener diodes 41 and 59 provide a constant voltage source for each of the triggering circuits 31 and 32 and provide a discharge path for the power capacitors 33 and 50, and the reference Zener diodes 41 and 59 also provide a discharge path for the reverse bias sampling charges on the respective sampling capacitors 36 and 53. In the normal operation described where the control voltage is about 110 volts RMS and the nominal voltage for which the magnet switch 1 is designed is around 90 volts D.C., the forward charge on the sampling capacitors 36 and 53 is not significantly discharged through the Shockley diodes, but it only discharged when the respective sampling half cycles exceeds 75 volts. Then the residual forward charge on the sampling capacitors 36 and 53 is discharged and the sampling capacitors 36 and 53 are recharged with a reverse bias sampling charge.

To generalize the above described operation, the sampling capacitor 53 in the negative half cycle triggering circuit 32 samples the amplitude of the positive half cycles. If the voltage is in excess of the nominal value, at which the magnet switch 1 is designed to operate, the sample charge on the sampling capacitor 53 delays the firing of the negative half cycle triggering circuit 32 during the subsequent negative half cycles for a period of time commensurate with the excess power applied across the A.C. control bus. Meanwhile, during the negative half cycles of control current, the sampling capacitor 36 in the postive half cycle triggering circuit 31 samples the excess in the negative half cycle, and delays firing its SCR 24 during the subsequent positive half cycles for a time necessary to reduce the A.C. control power to the rectifier 20 to the nominal level for which the switch 1 is designed.

The above described operation occurs when the RMS control bus voltage substantially exceeds the nominal value for the magnet switch 1, which is around 90 volts, but not infrequently it occurs that the RMS control voltage is less than, equal to or only slightly in excess of the nominal value. Under such circumstances, the sampling capacitors 36 and 53 would receive little or no reverse or back bias charge. As a result, the discharging power capacitors 33 and 50 could breakover the Shockley diodes 44 and 61, respectively, before the control voltage would forward bias the respective SCR's 24 and 25. In other words, the triggering signals would be emitted during the respective sampling half cycles and before the controlled half cycles for each SCR 24 and 25. Hence, the SCR's 24 and 25 would never become conductive and flow of control current would be interrupted.

The parallel RC networks in series with the Shockley diodes 44 and 61 ensures the presence of a triggering signal on the control elements 29 and 30 of each SCR 24 and 25, respectively, during their respective control half cycles in low control voltage situations. The discharging power capacitors 33 and 50 charge the sampling capacitors 36 and 53 to maintain 20 volts across the respective Shockley diodes 44 and 61, which with the parallel RC circuits function like relaxation oscillators. When the voltage across the Shockley diode 44 or 61 from the respective sampling capacitor 36 or 53 exceeds 20 volts, the Shockley diode 44 or 61 breaks over, charging the respective oscillator capacitor 46 or 63 until the voltage developed across the Shockley diode 44 or 61 is reduced sufficiently to turn off the Shockley diode 44 or 61. While the Shockley diode 44 or 61 is in its "off" state, the oscillator capacitor 46 or 63 discharges through the parallel 2 kilohm resistor 45 or 62 respectively. When the charge on the oscillator capacitor 46 or 63 is reduced sufficiently below that on the sampling capacitor 36 or 53, respectively, so that the voltage across the Shockley diode 44 or 61 again reaches 20 volts, breaking over the associated Shockley diode 44 or 61, the oscillator capacitor 46 or 63, respectively, is recharged. This oscillation continues well into, if not through the controlled half cycle of each SCR 24 and 25, permitting conductance of full control bus power. Hence, the triggering signal emitted by the triggering circuits 31 and 32 is not a single spike, but instead a continuing series of firing spikes.

It is now apparent that for the proper operation of this embodiment care must be exercised in selecting the sizes of the circuit elements. It will be noted that in this preferred embodiment, the capacitance of the power capacitors 33 and 50 is ten times the capacitance of the sampling capacitors 36 and 53, and the capacitance of the sampling capacitors 36 and 53 is a little more than four and one-half times the capacitance of the oscillator capacitors 46 and 63. Similarly the current limiting resistors 34 and 51 in series with the power capacitors 33 and 50 are of relatively small resistance to provide rapid charging of the power capacitors whereas the voltage dropping resistors 39 and 57 are large so as to maintain a charge of the power capacitors 33 and 50. The discharge rate of the sampling capacitors 36 and 53 may be adjusted by means of the timing potentiometers 40 and 58 to change the firing time of the SCR's 24 and 25.

While the parameters of the preferred embodiment are recommended for the specific use intended, they are by no means necessary to the invention. It is preferred, however, that the circuit parameters and elements selected provide a substantially constant source of power that will not fluctuate greatly with the charging and discharging of the sampling and oscillator capacitors 36, 53 and 46, 63, respectively. It should be noted that although a charge storage device in the form of the power capacitors 33 and 50 is employed in this embodiment for obvious economy reasons, an auxiliary voltage supply such as a battery or its equivalent could be used as a power supply. It is plain that where there is no need to provide for low control bus voltage conditions, the oscillator capacitors 46 and 63 and parallel timing resistors 45 and 62 can be omitted. The breakover voltages of the Shockley diodes or equivalent components and the voltage limiters should be selected to match the other components of the circuit.

In its broadest aspect, the pick-up impact reduction circuit is an analog computer. It integrates the power of one half cycle to govern the power of the next half cycle accordingly with the result that a substantially constant, predetermined power is achieved. Hence, this invention may be expected to find application outside of the motor control field.

The magnet switch 1 is so constructed that the economizer contact 26 opens just before impact at the end of the pick-up stroke. When the economizer contact 26 opens, the controlled current valve or the SCR's 24 and 25 are removed from the A.C. control bus and the entire pick-up impact reduction circuit described ceases to have any effect on the operation of the switch. The entire A.C. control current must pass through the economizer after the economizer contact 26 is opened, with the damping resistor 27 preventing arcing across the economizer contact 26 and oscillation between the economizer capacitor 28 and the switch coil 7. A substantial portion of the A.C. control voltage is absorbed in the economizer capacitor 28, so that the power to the coil 7 is reduced to the minimum amount necessary to hold the switch 1 in the closed condition. The cooperating forces of inertia plus the field of the holding current is sufficient to complete closure of the switch 1. The economizer eliminates the need to construct the coil 7 for a rating sufficient to permit sustained application of the heavy pick-up current over a long period of time.

To open the line contacts 2 of the switch 1, the stop switch 13 is opened, deenergizing the control relay coil 9. When the control relay coil 9 is deenergized, the holding contact 12, the A.C. control contact 22 and the D.C. control contact 68 are opened. When the D.C. control contact 68 is thus opened, the energy stored in the field of the coil 7 is trapped and can only be dissipated through the dissipation resistor 70, since the SCR 71 is non-conductive. In the absence of a dissipation path, the voltage across the coil 7 would surge to a level sufficient to force a catastrophic discharge of the energy in the coil 7. At the other extreme, a short across the coil 7 would permit a slow dissipation of the energy. Hence, the dissipation resistor 70 is inserted across the D.C. control contacts 68, and thus across the coil 7, to prevent arcing across the D.C. control contacts 68 and to permit rapid discharge of the field energy of the coil 7 so that the line contacts 2 will drop open quickly.

To reduce impact on drop-out, the present invention inserts a very low resistance path across the coil 7, after rapid decay on a portion of the field of the coil 7 through the resistor 70, so that a rapid initial opening of the line contacts 2 can be achieved with a slowed drop-out stroke and a correspondingly reduced drop-out impact. When the control relay 8 is deenergized opening the D.C. control contact 68, the polarity across the coil 7 instantaneously reverses as the field of coil 7 seeks to perpetuate the flow of current through the coil 7. The current through the field dissipation resistor 70 generated by the decaying field also charges the field measuring capacitor 72 through the resistor 74 and potentiometer 73. When the voltage thus developed across the field measuring capacitor 72 reaches 20 volts, the Shockley diode 76 breaks over, discharging the capacitor 72 through the control element 78 of the SCR 71. The SCR 71 is connected across the coil 7 to be forward biased by the potential generated by the decaying field. Hence, when the capacitor 72 discharges through the control element 78 of the SCR 71, the SCR 71 becomes conductive and presents a virtual short across the coil 7. This short through the SCR 71 sustains the field of the coil 7, and decelerates the drop-out of the armature 5 of the magnet switch 1 to reduce the force of the impact at the end of the drop-out. The timing of the firing of the SCR 71 can be varied by adjusting the resistance of the timing potentiometer 73 in series with the field measuring capacitor 72 to change the rate of charging the capacitor 72.

The combination of the timing circuit made up of the resistor 74, potentiometer 73 and field measuring capacitor 72, with the signal shaping circuit including the Shockley diode 76 to fire the SCR 71, also may be considered a computer. That combination functions to integrate the current generated by the decaying field of coil 7 to fire the SCR 71. The presence of the Shockley diode 76 in the signal shaping circuit provides a fast rising triggering signal to the SCR 71 form a reasonably small field measuring capacitor 72. The use of a low capacitance field measuring capacitor 72 permits a broad range of timing variation by manipulation of the resistance of the timing potentiometer 73.

This embodiment of the present invention has been described in sufficient detail so that any literate person can make it, and so that one skilled in the art will be able to make and use the invention in its full scope. Persons having ordinary skill in this art will readily appreciate that the invention is not limited to the details of the preferred embodiment disclosed and described here. Instead, the invetnion is set forth in the claims that follow.

We claim:
1. A control circuit responsive to sum of total current to a load under varying voltage, comprising the combination of
   a source of electrical energy;
   a power supply functioning as a continuous unidirectional voltage supply and connected to be energized by said source;
   a timing device including a sampling capacitor connected across said power supply and connected to be charged by a current to be controlled;
   signal shaping device for forming a triggering signal and containing a normally non-conductive current gate connected across said sampling capacitor and to said power supply and being responsive to a voltage drop across said sampling capacitor so as to present a low resistance to current flow when a voltage across said sampling capacitor exceeds its breakover voltage to present low resistance discharge path for said power supply and said sampling capacitor;
   a current valve having a control element, being responsive to a triggering signal to control its conductivity and being connected to control said current to be controlled;
   and a coupling means connecting said normally non-conductive current gate to said control element of said current valve to conduct said current flow to said control element of said current valve to serve as a triggering signal.

2. A control circuit as set forth in claim 1 wherein said source of electrical energy is an A.-C. line;
   A.-C. current in said A.-C. line is said current to be controlled;
   said power supply is a power capacitance connected across said A.-C. line and has a capacitance substantially greater than the capacitance of said sampling capacitor.

3. A control circuit as set forth in claim 1 wherein said source of electrical energy is a rectifier;
   said power supply is a coil of D.-C. magnet switch connected across said rectifier to actuate contacts when said coil is energized by said rectifier and when said coil is deenergized;
   and said current valve is connected across said coil to control discharge of energy stored in said coil when said coil is deenergized.

4. A control circuit as set forth in claim 2 wherein said voltage responsive current gate is connected in series with a parallel RC network containing an oscillator capacitor and a discharge resistor.

5. A control circuit as set forth in claim 1 wherein said electrical source is an A.-C. line;
   said power supply is a power capacitor connected across said A.-C. line carrying said current to be controlled;
   said sampling capacitor is also connected across said alternating current line;
   and said current valve is series connected in said alternating current line.

6. A control circuit as set forth in claim 1 wherein said source of electrical energy is a rectifier;
   said power supply is a coil of a D.-C. magnet switch which when energized and deenergized generates and dissipates magnetic fields for actuating switching contacts;
   said sampling capacitor is connected in series with a variable resistance across said coil to be charged thereby;
   said controllable current valve is a silicon controlled rectifier connected across said coil;
   said coupling means is a resistor connecting said voltage responsive current gate to a control element of said silicon controlled rectifier;
   and a field energy dissipating resistance is connected across said coil parallel to said current valve.

References Cited

UNITED STATES PATENTS

| | | | |
|---|---|---|---|
| 3,211,958 | 10/1965 | Miller et al. | 317—60 |
| 3,267,289 | 8/1966 | Washington et al. | 307—88.5 |
| 3,271,700 | 9/1966 | Gutzwiller | 332—14 |
| 3,281,638 | 10/1966 | Crawford | 320—40 |
| 3,319,126 | 5/1967 | Green et al. | 317—33 |
| 3,321,641 | 5/1967 | Howell | 307—88.5 |

JOHN F. COUCH, *Primary Examiner.*

W. H. BEHA, JR., *Assistant Examiner.*

U.S. Cl. X.R.

307—88.5; 317—33, 142